E. GIRARDEAU.
DYNAMO IN COMBINATION WITH AUTOMATIC SWITCH.
APPLICATION FILED MAR. 11, 1916.
1,193,537.
Patented Aug. 8, 1916.
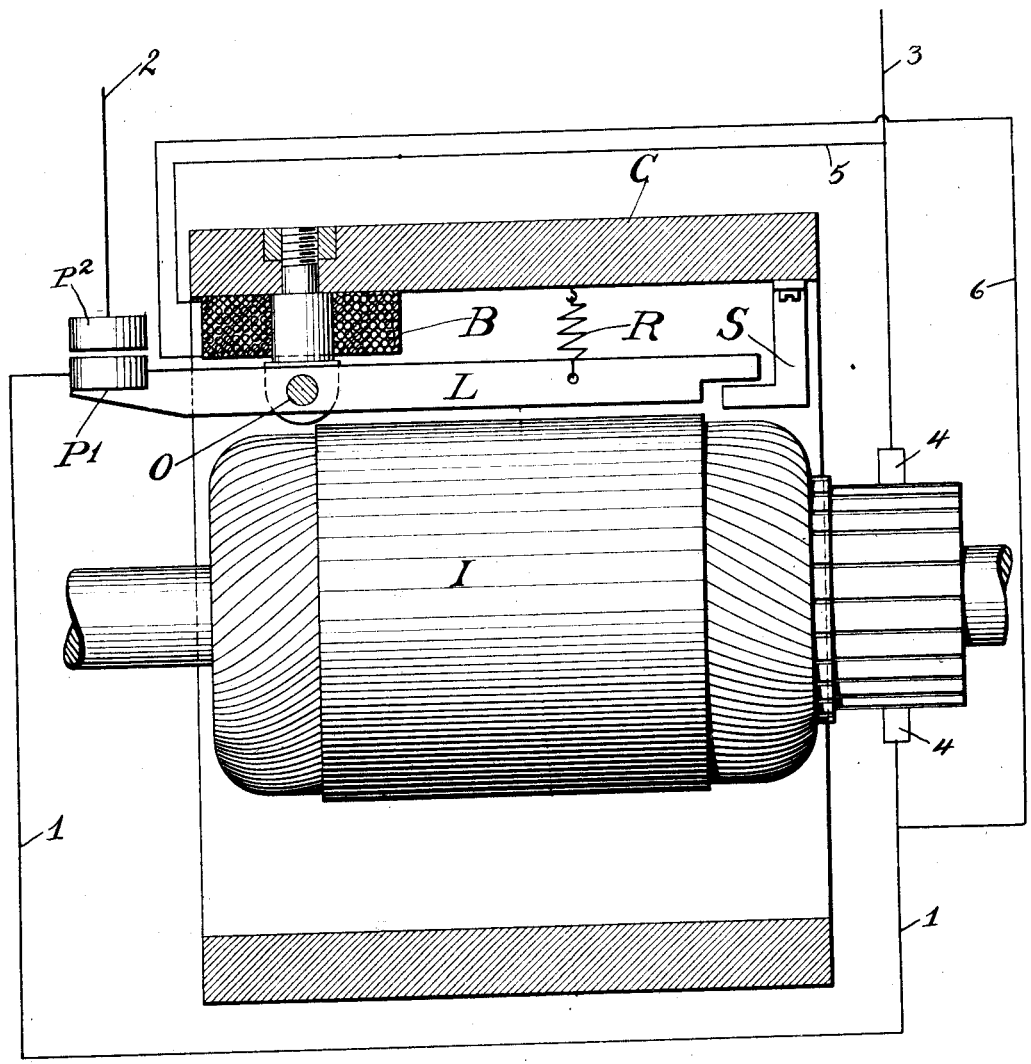
Inventor
Emile Girardeau
By
B. Singer
Attorney

UNITED STATES PATENT OFFICE.

EMILE GIRARDEAU, OF PARIS, FRANCE.

DYNAMO IN COMBINATION WITH AUTOMATIC SWITCH.

1,193,537.  Specification of Letters Patent.  Patented Aug. 8, 1916.

Application filed March 11, 1916. Serial No. 83,535.

*To all whom it may concern:*

Be it known that I, EMILE GIRARDEAU, engineer, residing at 10 Rue Auber, in Paris, France, have invented new and useful Improvements in Dynamos in Combination with Automatic Switches.

The combination of a dynamo with a cut-in and a cut out device, for any purposes, and particularly for charging the accumulators, is well known. This simplifies the whole installation, reduces the space required and is especially suitable for the use of small power dynamos, like the ones usually employed for motor car lighting.

In previous arrangements, the field-poles of the dynamo take the place of the thin wire electromagnet of the automatic cut-in and cut-out. The charging circuit is closed as soon as the generator reaches a certain speed since the magnetic force of the field poles is then sufficient to attract an iron slip specially designed for this purpose and to form an armature over it. The protection of the dynamo against reverse current is assumed by a small auxiliary coil connected in the charging circuit and wound on the above mentioned armature, the connections being disposed in such a way that the effect of their windings assists the one of the field poles when the voltage of the generator is higher than the electromotive power of the storage battery and in the reverse case, has on the contrary a different result opposing the direction of the magnetic flux of the armature, causing then a sudden breaking of the charging current. This disposition, and the similar ones, can only work satisfactorily when the flux in the field-poles can be kept nearly constant, but is impracticable as soon as the speed of the generator is subject to large variations.

In reality in order to keep the electromotive force nearly constant, the flux produced by the field pole windings must be reduced proportionally to the speed and consequently the flux becomes easily too weak to keep the charging circuit closed. The present invention obviates this important inconvenience.

As a principle, the invention consists in using the field produced by the generator armature for actuating the automatic cut-out. A magnetizing coil, disposed inside of the dynamo frame and connected to the brushes causes the cut-in.

The accompanying drawing shows a form of the realization of the invention. The generator is supposed to be of the bipolar type with horizontal field poles, the figure being obtained by a vertical cut of the field poles in the axial line, and also showing the circuit diagrammatically.

The magnetic yoke of the dynamo is indicated at C and the brushes of the dynamo are indicated at 4 4, the main leads 1 and 3 being connected to the brushes 4 4. Pivotally mounted at the point O is an iron slip L, the motion of which in one direction is limited by stop S and and which is urged in the opposite direction by a spring R. Inside of the magnetic yoke C is located the coil B which is connected to the brushes 4 4 by the leads 5 and 6 and which is used to magnetize and polarize the iron slip L. When the generator reaches a certain speed, the iron slip L turning on the point O, is attracted by the magnetic mass of the generator armature I and assumes the contact with the contact-pieces $P^1$ and $P^2$. One of them is stationary, the other movable and supported by the slip L. One side of the charging circuit is closed through the conductors 1 and 2, which are connected to $P^1$ and $P^2$ respectively.

Provided that the connections are right, as soon as the dynamo generates, the field produced by the generator armature adds its effect to the one of the coil B, but if the storage battery tends to send current in the armature I, the direction of the armature field is reversed and the slip L is repelled by the armature and is retracted by the spring R, the charging current being thus automatically cut-out. It will be noticed that the action of the armature field is added to that of the spring R when the value of the reverse current reaches a certain importance.

By a suitable degree of saturation of the iron slip L any disturbance of the commutation is avoided.

Having now described the nature of my said invention and in what manner the same has to be performed, I hereby declare that what I claim is:

1. A charging unit comprising in combination a continuous current generator, and an automatic switch comprising a magnetizing coil connected to the brushes of the generator in such a way, that the magnetic field produced by this coil assists the one produced by the generator armature.

2. The combination with a continuous current generator of an automatic switch comprising a slip of magnetic material on which is mounted one of the switch contacts, said slip being pivotally mounted and having one end placed in position to be responsive to the armature flux to open the switch and a coil connected across the brushes of the generator for magnetizing said slip.

3. The combination with a continuous current generator of an automatic switch comprising a slip of magnetic material on which is mounted one of the switch contacts, said slip being pivotally mounted and having one end placed in position to be influenced by the armature flux, and a coil connected across the brushes of the generator for magnetizing said slip, said slip being attracted by the armature when the current flows through the armature in the normal direction and being repelled by the armature when the current reverses therein.

In testimony whereof I have signed my name to this specification.

EMILE GIRARDEAU.